March 4, 1941. D. SAMIRAN Re. 21,741

FLUID SEGREGATOR

Original Filed March 12, 1930 4 Sheets-Sheet 1

INVENTOR.

BY: David Samiran

Cox Moore & Olson attys.

March 4, 1941. D. SAMIRAN Re. 21,741

FLUID SEGREGATOR

Original Filed March 12, 1930 4 Sheets-Sheet 2

INVENTOR.
David Samiran
BY: Cox Moore & Olson
Attys.

March 4, 1941. D. SAMIRAN Re. 21,741
FLUID SEGREGATOR
Original Filed March 12, 1930 4 Sheets-Sheet 3
FIG. 4.
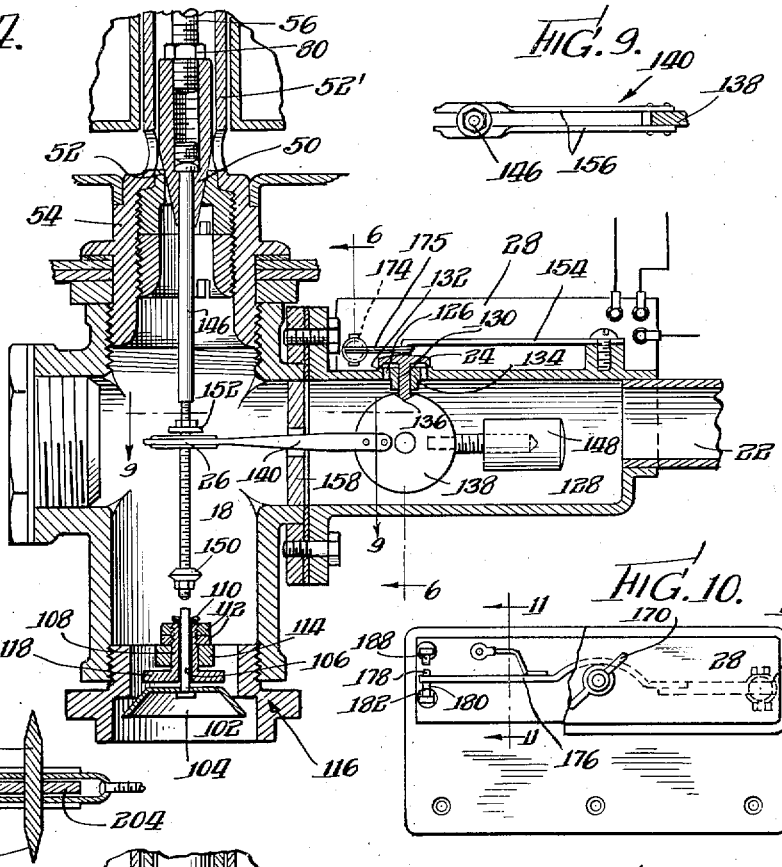
FIG. 9.
FIG. 10.
FIG. 12.
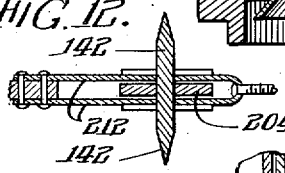
FIG. 5.
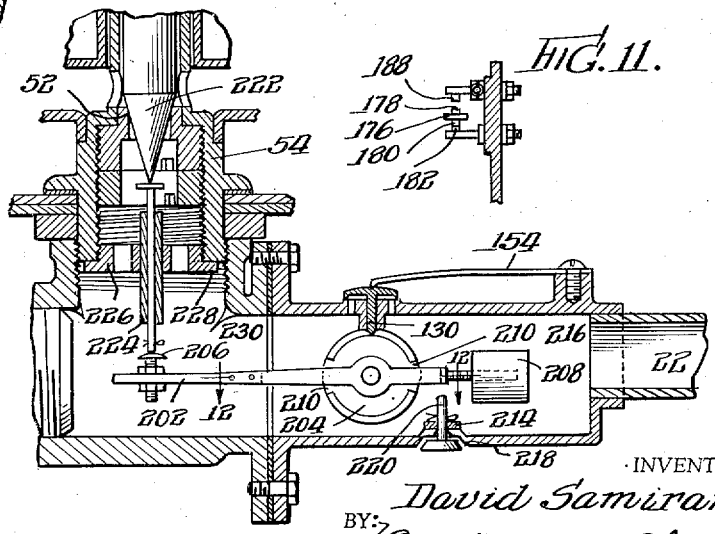
FIG. 11.
INVENTOR.
David Samiran
BY: Cox Moore & Olson
Attys.

March 4, 1941. D. SAMIRAN Re. 21,741

FLUID SEGREGATOR

Original Filed March 12, 1930 4 Sheets-Sheet 4

INVENTOR.

BY: David Samiran

Cox Moore & Olson attys.

Reissued Mar. 4, 1941

Re. 21,741

UNITED STATES PATENT OFFICE 21,741

FLUID SEGREGATOR

David Samiran, Dayton, Ohio, assignor, by direct and mesne assignments, to Tokheim Oil Tank and Pump Company, Fort Wayne, Ind., a corporation of Indiana Original No. 1,948,543, dated February 27, 1934, Serial No. 435,243, March 12, 1930. Application for reissue August 9, 1939, Serial No. 289,327

26 Claims. (Cl. 210—54)

(Granted under the act of March 3, 1883, as amended April 30, 1928; 370 O. G. 757)

The invention described herein may be manufactured and used by or for the Government for governmental purposes without the payment of any royalty thereon to the owner of the patent.

This invention relates to the class of fluid segregators for the automatic isolation of fluids of different specific gravities and more particularly to force-feed fluid systems in which a separation of nonmiscible fluids of different specific gravities is effected and is especially adapted to fluid supply systems in which the supply tank is practically inaccessible and in which the fluid is fed from the source of supply by suction impelling means.

It is well-known that while normally certain fluids of different specific gravities such as water and oil or water and gasoline are not miscible, these fluids when agitated will form an emulsion or a mixture that is not readily separable. When such non-miscible fluids are present in a force-feed fluid system and the tank is inaccessible to permit of a gravitational segregation of the fluid of heavier specific gravity that has settled to the bottom thereof, and it is desirable to isolate these fluids from each other, it will be apparent that such isolation must take place before passing through the pump or other suitable impelling means for the mechanical action of the latter tends to emulsify the components which thereafter have no opportunity to separate before reaching the point of delivery, due to the velocity of their passage through the delivery pipes.

To this end applicant's invention has for its objects to provide a fluid supply system in which a fluid segregator is interposed between and cooperates with the source of fluid supply and pump to automatically effect the separation of the undesirable components from the fluid prior to its discharge through the pump and immediately after it leaves the source of supply; to provide in a segregator system for the isolation of fluids of different specific gravities having a suction feed, means whereby the vacuum established in the segregator by said feed means is maintained to permit flow of fluid from the source of supply when the feed means is in operation, and means whereby the vacuum is destroyed when the feed means is not in operation to effect an intermittent segregation of said fluids; to provide in a segregator system having a segregator provided with a float operated needle valve, means for cooperating with said valve to control the flow of fluids into and out of the float chamber; to provide in said segregator system means for cooperating with said suction feed means to control the flow of the lighter component from said segregator; and to provide in a segregator system, means whereby a large quantity of the fluid of heavier specific gravity is accumulated and segregated in a single discharge.

Another object of my invention is to provide in a segregator, an auxiliary or settling chamber having metering means to meter the quantity of fluid passing from said chamber to the float chamber so that a maximum quantity of fluid of heavier specific gravity may be accumulated in said auxiliary chamber and segregated by said segregator in a single discharge.

Still other objects of the invention are to provide in a fluid supply system, and particularly in a gasoline dispensing system, means for segregating fluid of heavier specific gravity, preferably water, from fluid of lighter specific gravity, such as gasoline or other petroleum product fuel, and to provide means automatically actuated by a rise and/or fall in the level of liquid of heavier specific gravity for automatically discharging fluid of heavier specific gravity, and/or for stopping the fluid-forcing pump, and/or for closing communication in the liquid dispensing line between the pump and the discharge registry in the delivery end of the line, and/or for again automatically closing the discharge valve for stopping the discharge of the heavier fluid from the segregator, and/or for restarting the motor.

The foregoing features and others not heretofore mentioned are hereinafter described and claimed and are illustrated by the accompanying drawings. In the drawings:

Fig. 4 represents an enlarged vertical section showing the housing for some of the principal elements that control the automatic intermittent segregation of the heavier fluids from the lighter fluids;

Fig. 5 is a view similar to Fig. 4 showing a further embodiment of my invention;

Fig. 6 is a sectional view taken on the line

Figure 3:
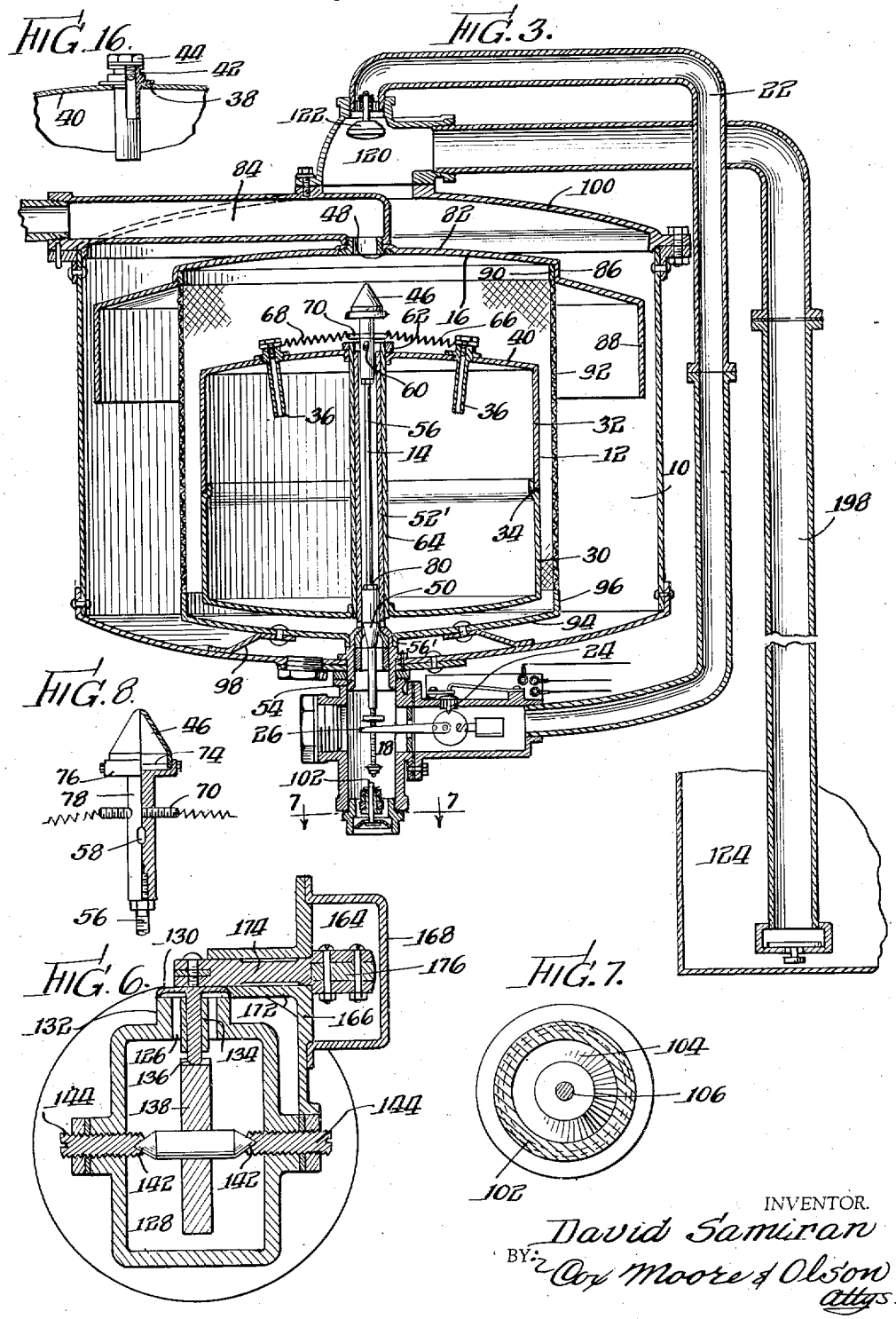
Fig. 3 represents a vertical section of an automatic fluid segregator adapted for a power operated suction fluid feed system, some parts being broken to be shown.
Figure 13:
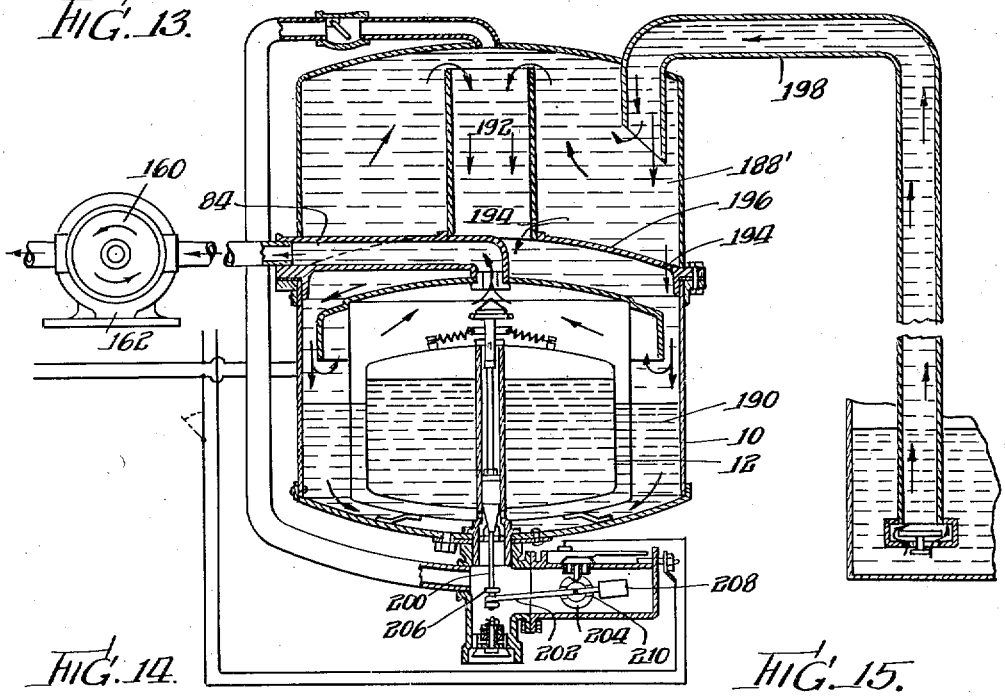
Figure 14:
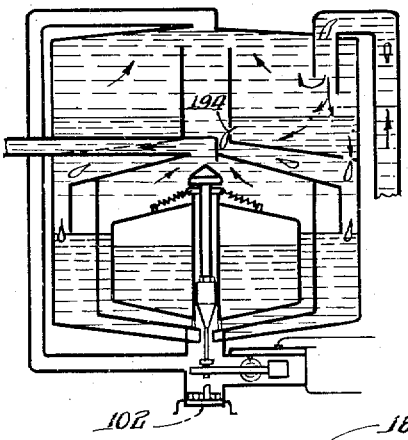
Figure 15:
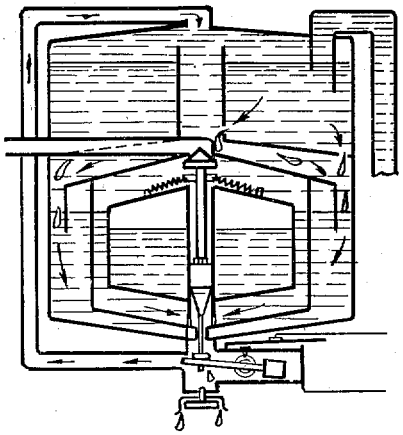

6—6 of Fig. 4 showing the relative arrangement of the switch housing and the control mechanism housing and their included elements;

Fig. 7 is a sectional view of the suction valve unit, the direction of the view being indicated by the lines 7—7 on Fig. 3;

Fig. 8 is a detail view partly in section showing the connection of the upper needle to the valve assembly;

Fig. 9 is a sectional plan view taken on the line 9—9 of Fig. 4;

Fig. 10 is a side of the switch unit, the cover plate being broken away so as to show certain features that would otherwise be covered from view;

Fig. 11 is a detail sectional view taken on the line 11—11 of Fig. 10;

Fig. 12 is a sectional partial view taken on the line 12—12 of Fig. 5 and showing the follower and lifting member;

Fig. 13 represents a diagrammatic view of an improved fluid feed system including a segregator that is provided with a settling chamber and improved link mechanism for controlling the bleeder valve;

Fig. 14 represents a diagrammatic view of the operation of the segregator shown in Fig. 13 showing the fluids of heavier specific gravity being accumulated in the settling or auxiliary chamber while the fluid of lighter specific gravity is being suction fed to the dispenser;

Fig. 15 represents a diagrammatic view of the operation of the segregator showing the fluids of heavier specific gravity to have accumulated in the auxiliary and float chambers to a predetermined position therein, the upper valve closed to cut off the suction feed and the lower needle and suction valves open to permit the simultaneous segregation of the heavier fluids from both chambers;

Fig. 16 is a detail view of the stand pipe construction; and

Figure 17:
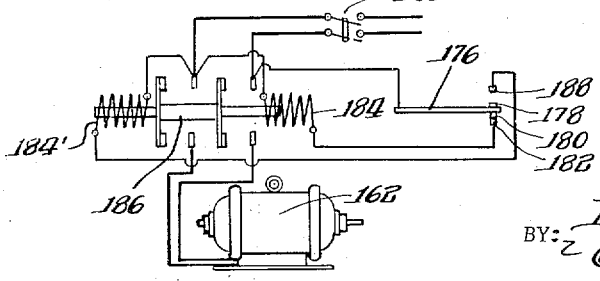

Fig. 17 represents a wiring diagram of the circuit shown in Fig. 13.

Figure 1:
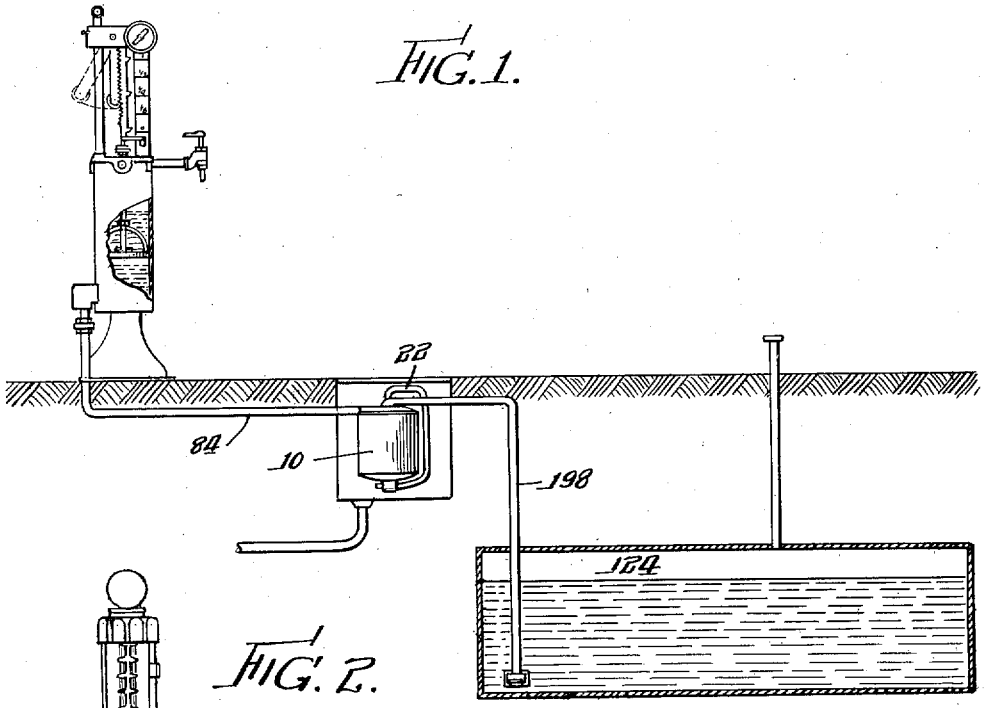
Fig. 1 represents a diagrammatic view of a manually operated fuel dispensing system showing an automatic fluid segregator interposed between and forming a part of the fuel feed line from the underground supply tank and dispenser.
Figure 2:
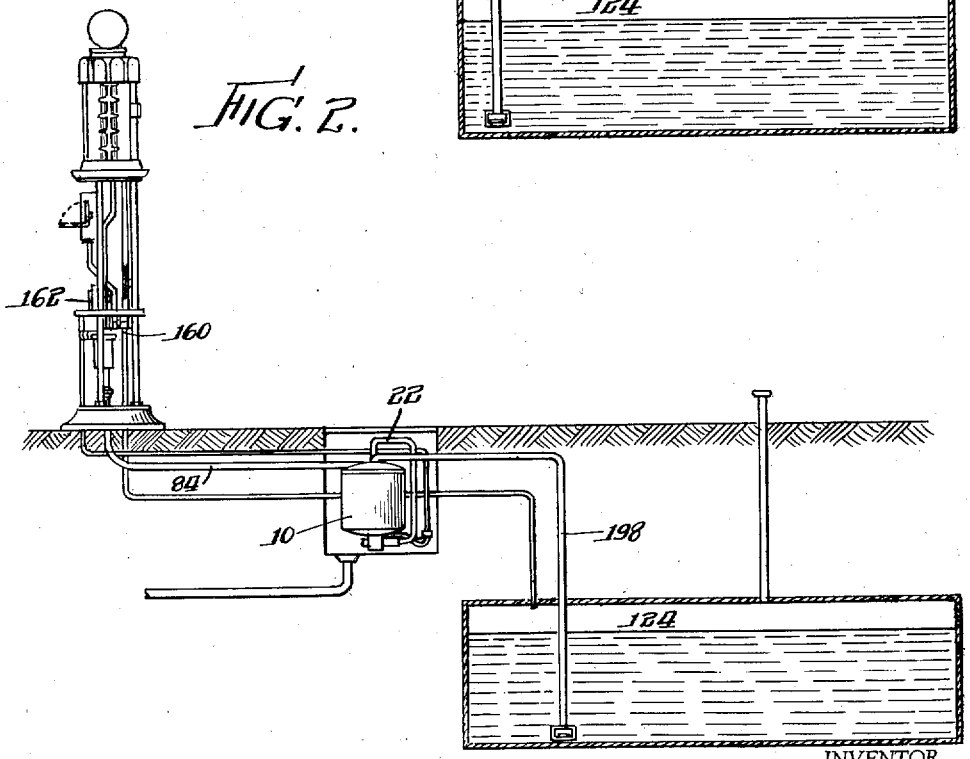
Fig. 2 represents a view similar to Fig. 1 showing the automatic fluid segregator applied to a power operated dispensing system.

In illustrating a preferred embodiment, my invention is shown in connection with a gasoline fluid dispensing system in which the suction feed of the fluid from the source of supply is accomplished either manually, as shown in Fig. 1, or by power means, as shown in Fig. 2. The system comprises a source of supply of gasoline that is located, as is the general custom, in an underground tank, a fluid segregator adapted to segregate fluids of heavier specific gravity from a fluid of lighter specific gravity, and a suction pump which may form a part of the discharge register, the segregator being interposed between the source of supply, preferably adjacent thereto, and the suction pump, and being adapted to receive the fluid to segregate the undesirable components prior to its being pumped to the discharge register.

The segregator mechanism is adapted to automatically segregate the undesirable components and embodies controlling means to automatically control the flow of fluid into and out of the segregator from the gasoline. When the suction feed is power actuated, the control means is further adapted to automatically control the operation of the suction device.

In the power actuated suction feed illustrated in Fig. 2 and described herein, a combination of valve means and electrical means is utilized, the valve means cooperating with the suction device to create a vacuum whereby a flow of fluid through the segregator mechanism is established and to destroy the vacuum when a predetermined quantity of undesirable component or components such as water in the dispensing of gasoline has accumulated, to permit the automatic segregation thereof. It is to be understood, however, that the invention is not limited to suction actuated valve means for the establishment of the fluid flow through the segregator.

The improved segregator illustrated, in connection with which the control means is particularly described, embodies the principles disclosed in United States Letters Patent No. 1,700,811 granted to me February 5, 1929, and includes a float chamber 10, a float 12 disposed within said chamber, a needle valve member 14 controlled by the float, and a housing 16 disposed within the float chamber for completely partitioning the float and valve mechanism within the float chamber.

The control means, according to the invention illustrated in Figs. 3 and 4, is disposed within a housing 18 and comprises a suction valve unit 102 that is suction actuated to atmospherically seal the float chamber, an air-bleed or by-pass 22 leading from the housing 18 to the upper portion of the float chamber 10, a bleeder valve 24 and link mechanism 26 actuated by the float operated needle valve member 14, the link mechanism being adapted to actuate the bleeder valve 24 which in turn controls a switch 28.

According to the design shown, the float 12, which is slidably mounted on a guide 52′ for the needle valve member 14, is constructed of two cylindrical sections 30, 32 having their open ends jointed together by telescoping the flange 34 formed on the upper edge of the cylinder section 30 within the cylinder section 32 and welding their abutting edges. The float 12 is ballasted, as shown in Fig. 13, by a liquid ballast in substantially the identical manner disclosed in my above referred to patent. The stand pipes 36 which are alike in construction (see Fig. 3) are, however, positioned at the upper end of the float instead of at the bottom, as disclosed in my above referred to patent. The upper portion of each stand pipe is provided with a flange 38 (Fig. 16) that is secured in a suitable manner, such as by welding, to the upper wall 40 of the float chamber and has an annular groove 42 for a purpose hereinafter described. The stand pipe is interiorly threaded to receive a complementary threaded plug 44 for sealing the float after being ballasted.

The needle valve assembly comprises an upper needle valve 46 (Figure 3) cooperating with a valve seat member 48 to control the float chamber outlet for the lighter fluid, a lower needle valve 50 cooperating with a valve seat member 52 to control the float chamber outlet or discharge opening for the heavier fluid, and an adjustable needle valve stem 56. The valve seat member 52 is threaded within a threaded end or nipple 54 of the valve guide 52′. The valve guide 52′ comprises, as clearly shown in Figures 3 and 4, an upstanding, reduced, tubular part enlarged at its lower end to form the internally and externally threaded end or nipple 54, the nipple 54 being threaded into an upstanding, internally threaded pipe flange of the housing 18. The float has a limited floating vertical movement relative to said needle valve assembly, which floating action is effected by providing the needle valve stem 56 with a slot 58 (Figs. 3 and 8) to loosely receive a pin 60 that is secured to a collar 62. The collar 62 is secured to the upper projecting end of a float sleeve 64 which extends centrally of the float and is secured to the upper and lower centrally apertured walls of the float 12. The needle valve assembly is yieldingly secured to the float by means of coil springs 66, 68, the outer ends of which are secured within the annular grooves 42 of the stand pipes 36 and the inner ends of which are attached to an adjustable member 70 that is disposed at right angles to an upper enlarged part 78 of the needle valve stem 56 and threaded therein to permit a lateral adjustment of the needle valve assembly to center the same relative to the float.

A characteristic novel feature of the valve assembly is that it is provided with means to permit the upper valve 46 to be properly seated in the valve seat 48. This feature, according to the illustrated embodiment shown in Fig. 8, is made possible by forming the valve as a hollow cone which is received within and loosely connected by means of a pin 74 to the circular flange 76 projecting upwardly from the upper valve stem part 78. According to this arrangement, slight misalignment of the outlet valve seat 48 and discharge valve seat 52 can be encountered and still effect a proper seating of the valves 46, 50, respectively, since they are relatively movable with respect to each other and to the float. With this arrangement a proper seating of the upper valve will be insured when the difference in the specific gravity of the heavier and lighter fluids is very small, giving to the float, of course, a comparatively small buoyant force; since the needle valve 46 is light and very little force is required to move the same laterally. In order to provide for the proper seating of the lower valve in valve openings of different size, the valve 50 is threaded over the stem 56 (see Figure 4) and can be adjusted vertically upon loosening the lock nut 80.

The deflector 82, shown best in Fig. 3, is positioned above and supported in the float chamber in spaced relation to the float, and is affixed to the outlet pipe 84 in such a manner as to deflect the incoming fluids towards the walls of the float chamber. This deflector 82 is constructed to provide an inner annular flange 86 and an outer annular flange 8. The inner flange forms a guide for a collar 90 that is secured to a sieve 92, while the outer flange projects substantially below the inner flange and forms a passage with the wall of the float chamber whereby the deflected incoming fluids are directed towards the bottom of the chamber and away from the sieve. A lower deflector 94 is arranged in the float chamber in spaced relation to the float and is supported by means of an annular shoulder formed on the nipple 54 of the needle valve guide 52', the part of the nipple above the annular shoulder slidably receiving an annular flange 56' that is centrally disposed and formed at the bottom of the deflector 94. The sieve is fixedly secured at one end to an upwardly presented flange 96 of the deflector 94 and at its other end to the collar 90 which, as heretofore stated, is slidably received within the flange guide of the deflector 82. In order to insure a close contact between the upper edge of the collar and the deflector 82, the bottom deflector 94 is arranged to be yieldingly urged upwardly. This is accomplished by interposing a pair of flat springs 98 between the deflector and the bottom wall of the float chamber.

It will thus be seen that the sieve and bottom deflector can be removed as a unit by an upward lift after the top 100 of the float chamber to which the upper deflector and outlet pipe are attached has been unbolted from the float chamber.

Since, as hereinbefore stated, it is desirable to segregate the heavier fluids from the lighter fluids, after the fluids leave the supply tank and before entering the suction pump, the segregator which is a part of the suction line must be air-tight to permit the pumping of the fluid from the source of supply. Accordingly, the invention includes means for this purpose, said means, as shown, comprising the valve unit 102 secured to the housing 18. This valve unit is constructed to readily respond to the reduced pressure, effected within the float chamber when the suction pump is in operation, to atmospherically seal the segregator, thus producing an air-tight suction line, and is also provided with means to assist in breaking the vacuum in the float chamber when the suction pump is inoperative or when the suction produced by the pump is cut off to permit the segregation of an accumulation of the fluids of heavier specific gravity. As best shown in Fig. 4, the valve unit comprises a valve member having a bowl-shaped valve head 104 made of relatively light sheet metal and a valve stem 106 that is integral with the valve head. This valve is slidable within a relatively heavy plunger 108 and is provided with a stop such as a cotter pin 110 that passes through an opening in the valve stem and rests against the face of an adjusting nut 112 which serves as a stop for the plunger 108. The plunger 108 is slidable within a bearing 114 made integral with the valve seat member 116. The plunger is also provided with a lower flange 118 which serves as a stop to limit its upward movement and is disposed in spaced relation to the valve head and bearing when the valve is in the open position. It will thus be seen that when the valve is in the open position, the suction pump will produce only a slight reduction of pressure in the float chamber, but inasmuch as the valve member is relatively light, it will require only a small pressure drop in the float chamber to effect an upward movement thereof. As the valve member, however, moves upward to close the valve, it engages with the plunger, the valve opening becomes more and more restricted, and the pressure drop is consequently increased to cause the plunger to be carried upward by the suction actuated valve member. The valve and plunger member will remain in the upward position as long as fluid is being sucked from the source of supply. When, however, the suction produced by the pump ceases, either by reason of the pump being inoperative or because of the suction being cut off by the upper float operated valve 46, the valve and plunger members will tend to be restored by gravity to their lower positions whence any fluid of heavier specific gravity accumulated in the float chamber and housing will automatically be segregated.

Since the destroying of the vacuum in the float chamber is dependent to a large extent upon air seepage through the valve 102, which air must pass through and displace respectively the fluids in the float chamber, and also because the rate of opening of the valve is more or less dependent upon the speed with which the vacuum is destroyed, it will be seen that the segregation of the fluids under the conditions so far described is relatively slow. To increase the rate of vacuum reduction in the float chamber and, consequently, obtain a more rapid segregation of the fluids of heavier specific gravity, means is provided to bypass the air flow to the top of the float chamber as it enters the housing 18. Accordingly, the pipe 22 heretofore mentioned serves as an air passage and is suitably connected at its lower end to the housing 18 and at its upper end to a hollow fixture or coupling 120 that is bolted to and has a common opening with the top of the float chamber. The upper end of the pipe 22 is provided with a suitable check valve 122 to prevent the loss through the pipe and valve of the overflowing fluid in the register, which fluid is normally returned to the supply tank 124. As shown in Fig. 3, according to my invention, this check valve 122 is of the floating type and is slidably supported in a bearing in the open end of the tube and is adapted to float in the fluid of lighter specific gravity.

It will, of course, be apparent to those skilled in the art that according to the design illustrated, as long as there is no accumulation of fluids of heavier specific gravity, the lighter fluids can be suction fed to the register without interruption. When, however, a predetermined quantity of the heavier fluids have accumulated in the float chamber, the upper valve member 46 will be floated into its valve seated position and the suction feed to the register will be temporarily discontinued. It is, of course, desirable, especially when the fluid is being dispensed from the register, to have the period of the temporary interruption as short as possible. To this end, I have provided means to further increase the rate of vacuum reduction in the float chamber and, consequently, cause a more rapid segregation of the heavier fluids. This means comprises an air bleed 24, referred to above, that is controlled by the float operated valve mechanism through link mechanism 26 to which it is operatively connected. The air bleed, as shown in Figs. 4 and 6, consists of perforations or ports 126 formed in the upper wall of the casing 128 which forms a part of or is attached to the housing 18. These perforations are opened or closed through a valve member 130, the head of which is seated on the boss 132 formed integral with the casing and encloses the perforations; and the stem of which is slidably guided in the bearing 134 and has its end resting in a notch 136 formed on a lifting member 138 that is fixedly secured to a follower 140. This lifting member is pivoted by means of trunnions 142 resting in bearings 144 that are adjustable to centralize the member and follower. The follower has spaced apart arms 156 (Fig. 9) to receive a plunger 146. The lifting member, oppositely to its point of connection to the follower, is threaded to receive a balancing counter weight 148. The plunger 146 is detachably secured to and projects downwardly from the needle valve 50 (see Fig. 4). The lower portion of this plunger has threaded thereon stop members 150 and 152 which are spaced to provide a lost motion connection between the plunger and the follower. These stop members are spaced a distance substantially the same as the distance between the upper valve seat 48 and the normal floating position of the upper valve 46. It will thus be seen that the follower is given but a slight up or down movement as the upper needle valve and lower needle valve approach their respective valve seats and that the bleeder valve will be correspondingly lifted out of or seated in the notch of the lifting member, the bleeder valve member 130 being yieldingly held in place by means of a flat spring 154 that has one end bearing on the valve head and its other end attached to the casing.

The plunger 146, which is removable with the float operated valve mechanism, is readily operatively connected to and detached from the follower arms 156 (Fig. 9) which are made of spring material and are sprung outwardly by the stop 150 as it passes between them. This springing action is facilitated by flaring the upper and lower edges of the arms 156 outwardly and by tapering the sides of stop 150 to form a wedge that is V-shaped in cross section. A plate 158 is disposed within the housing 18 and is provided with an opening to receive and limit the upward and downward movement of the follower when the plunger is disconnected therefrom or connected therewith.

The suction pump 160 as shown in Fig. 13 is actuated by an electric motor 162 which is automatically controlled to stop the pumping action when the upper valve member 46 is in closed position and to start the pumping action when the lower valve member 50 is in closed position. This is accomplished by means of the link mechanism heretofore described. While this mechanism is adapted to control the bleeder valve, it also serves to actuate through the bleeder valve member a switch that controls the operation of the suction pump. Any suitable make and break switch of the conventional type may be used for this purpose and is best shown in Figs. 6 and 10. The switch is adapted to alternately complete two circuits, the one circuit containing an electromagnet to actuate a control switch for shutting off the suction pump motor, the other circuit containing an electromagnet to actuate said control switch for starting said motor. The switch 28 is constructed as a separate assembly and housed in such a manner as not to be exposed to gasoline vapors, thus avoiding fire hazards. The switch mechanism is disposed within a housing 164 that is made of two parts, a back plate 166 and a front plate 168, the front plate being clamped by means of a clamp nut 170 to the back plate which in turn is bolted to the housing 18. The back plate is provided with a bearing 172 to receive a rocker shaft 174 which has one end projecting into the housing and its other end propecting outside thereof. The outer end of the rocker shaft is secured to an operating arm 175 (Figure 6) extending over the valve member 130 and under the spring 154, and the inner end of this shaft has secured thereto a contact arm 176 that is provided with contacts 178 and 180 on opposite faces. The arm 176 is therefore yieldingly urged downwardly by the spring 154 to move the contact 180 into engagement with contact 182 as the lower needle valve 50 is closed. This completes the electric circuit to energize an electromagnet 184 (Figure 17) which in turn throws in the control switch 186 to start the motor 162 when the main switch is closed. On the other hand the contact arm 176 is forced upwardly by the link mechanism through the bleeder valve member 130 to move the contact 178 into engagement with the contact 188 when the lower valve 50 is open and the upper valve 46 is closed. Movement of the contact 180 upwardly and away from the contact 182 will have no effect upon the control switch 186 until contact 178 engages contact 188 for the switch 186 is of the unbiased type and therefore remains in the position to which it was last moved until an external operating force is applied to move it in the opposite direction. When the contact 178 engages contact 188, a second electromagnet 184' is energized to open the switch 186 and stop the motor 162. Thus it will be apparent that it is only when contact is made with one contact or the other that the control switch is correspondingly thrown in or out. The contacts 182 and 188 being spaced, it will be seen that the contact arm 176 is permitted to have a movement corresponding with the movement of the needle valve member 14 and that the control switch 186 is respectively thrown in or out when the needle valve assembly is in its lowermost position to close the valve 50 or in its upper position to close the valve 46.

For purposes of explaining the operation of this segregator, it will be assumed that the suction control valve 46 is open, the discharge valve 50 is closed; the bleeder valve 24 is closed; the suction responsive valve 102 is open; and the check valve 122 is open. Since the bleeder valve 24 is closed, the contact 180 is in engagement with the contact 182. Hence, when the main switch 189 (Figure 17) is closed, the circuit is completed to the starting magnet 184 and hence the motor is energized and a dispensing operation initiated. The pump driven by the motor creates a suction pressure in the pipe 84 which, communicated through the opening 48, effects a reduction of pressure in the float chamber 10 and hence in the feed pipe 198 through the coupling 120 by which this fed pipe is connected to the top of the float chamber. The valve 122 being at this instant open, any air within the housing 18 is withdrawn through the pipe 22, thereby creating a suction pressure in this housing 18 to effect a closing of the suction sealing valve 102.

Fluid is thereby sucked from the underground tank 124 through the feed pipe 198 into the float chamber 10 in which the fluid of greater specific gravity settles from the fluid of lighter specific gravity, and the fluid of lighter specific gravity is withdrawn through the opening 48 and the pipe 84 into the suction side of the pump by which it is forced through the dispensing line. As the fluid passes through the coupling 120, the valve 122 is forced to closed position. Upon accumulation of the fluid of heavier specific gravity to a predetermined level in the float chamber, the valve 46 closes the opening 48, thereby preventing further flow of fluid to the suction side of the pump and cutting off the source of suction from the float chamber.

As the valve 46 closes the opening 48, the valve 50 opens the discharge opening of valve seat member 52 and the fluid of heavier specific gravity passes into the housing 18. As the valve 46 closes, the valve rod also actuates the bleeder valve 24 to effect a rapid destruction of the vacuum pressure in the housing 18, thereby effecting a rapid opening of the valve 20 which thereupon allows the fluid of heavier specific gravity to be discharged from the float chamber 10 through the housing 18. When the bleeder valve is moved to open position, the contact 178 is brought into engagement with the contact 188 to complete the cirsuit to the electromagnet 184′ which thereupon breaks the motor circuit to stop the pump.

When the fluid of heavier specific gravity has been discharged to a predetermined lower level within the chamber, the valve 50 is moved to closed position to prevent further discharge of this fluid, and the valve 46 is moved to open position, connecting the pipe 84 to the interior of the float chamber. As the valve 50 moves to closed position, the bleeder valve 24 is closed and the contact 180 is brought into engagement with the contact 182 to complete the circuit to the electromagnet 184, which thereupon moves the switch 186 to complete the motor circuit and start the pump motor 162.

Upon operation of the motor 162, the pump driven thereby effects a reduction of pressure in the pipe 84, thereby to cause, as previously described, the valve 102 to move to closed position, sealing the housing 18 against the entrance of air and withdrawing the air from the housing 18 through the pipe 22, and the valve 122. Fluid then flows from the underground tank into the float chamber, and the fluid of lighter gravity flows to the suction pump so that the dispensing operation is resumed.

A modification of my invention is shown in Fig. 13 in which the fluid segregating system is provided with a segregator that is similar to the segregator above described, but in addition thereto embodies means to permit the accumulation and segregation of a relatively large quantity of the fluids of heavier specific gravity, and also embodies a modification of the link mechanism for operating the bleeder valve.

This segregator comprises an upper chamber 188′ and a lower chamber 190. The upper chamber serves as a settling chamber to reduce the velocity of the incoming fluids, thereby permitting the natural separation of the heavier component from the lighter component and also serves in connection with a standpipe 192 that extends to nearly the top of the upper chamber and interconnects the same with the lower chamber, to permit an accumulation of the heavier fluids. A series of small openings 194 is provided in the partition 196, and also at the bottom of the standpipe, the aggregate open area of which is of such magnitude that in the event the fluids entering the upper chamber 188′ through the pipe 198 be of the heavier component, when the suction flow commences, the heavier fluid will have accumulated up to substantially the top of the standpipe when the accumulation of the heavier fluid is of a predetermined quantity in the float or lower chamber. The size or the number of these openings is also dependent upon the size of the discharge valve opening, since, as heretofore described, it is desirable to segregate the accumulated heavier fluids both in the float chamber and in the settling or auxiliary chamber in a single discharge. Referring to the drawings, Fig. 14 diagrammatically illustrates that when the valve 102 is maintained in its closed position, the inflowing heavier fluids are being accumulated in the upper and lower chambers, and Fig. 15 illustrates that it is possible, in accordance with the design disclosed, for the heavier fluid to have accumulated up to nearly the top of the standpipe in the settling chamber when enough of the heavier fluid has accumulated in the float chamber to cause the upper valve 46 to shut off the suction flow and the lower valve 50 to open the float chamber 10 to the housing 18. The suction valve 102 is therefore no longer maintained in the closed position, and the segregation of the heavier fluids can take place from both chambers simultaneously.

The link mechanism, as shown in this embodiment, comprises a plunger rod 200 and a follower 202 that is pivotally secured to and straddles a lifting member 204 (see Figure 12) that is supported on the housing in the manner shown in Fig. 6. The lifting member and follower are similar to those shown in Figure 5. As shown in Figure 5, the lifting member is normally restrained against pivotal movement by reason of the stem of the bleeder valve member 130 being seated in the notch of the lifting member 204. The plunger rod 200 (Figure 13) is made integral with the needle valve and in its downward position bears lightly on the head of a threaded member 206 (Figures 5 and 13) that is carried by the follower and is vertically adjustable in alignment with the plunger to adjust the relative normal positions of the needle valve and follower. The other end of the follower is provided with a counter weight 208 that is adjusted to make the follower slightly off balance to follow the needle valve in its upward movement and to exert enough pressure to lift the valve member 130 against the spring 154. The lifting member is provided with a pair of diametrically opposed notches 210 (Figure 5) on each of its sides to receive the arms 212 (Fig. 12) of the follower. The sides of the notches are normally equally spaced from the portions of the follower arms received in the notches. Spacing of the arms and notches provides a lost motion connection between the follower and lifting member to allow the follower to move with the needle valve until the upper valve is about closed, whence the arms contact with and rotate the lifting member, which in turn opens the bleeder valve member 130 for the purpose above described.

The modification shown in Fig. 5 additionally embodies a change in the position of the suction responsive valve and in the construction of the plunger rod of the link mechanism. In this view the valve member is similar to and adapted to function in substantially the manner described with respect to the valve member 104 shown in Fig. 4. This valve member, however, is slidably supported in a bearing 214 made integral with the bottom wall of the casing 216 and is adapted to be seated in a valve seat 218 formed therein. As a further means of returning the valve to its open position, the valve stem 220 is made of such dimension and is so positioned with respect to the follower that it will force this valve down at substantially the same time that it opens the bleeder valve member 130. The counter weight 208 can be adjusted to give the follower the added pressure required for this purpose.

In this embodiment the link mechanism is similar to the link mechanism disclosed in Fig. 13 except that the plunger does not form a part of the needle valve but is arranged in contactual relation therewith. This plunger is supported between the needle valve 222 and follower 202 and is adapted to slide vertically in a tubular guide 224 that is fixedly secured to the threaded member 226. The plunger, guide, and member are affixed to the nipple 54 as a unitary assembly by means of a threaded connection, the member 226 being provided with a flange 228 to limit the upward movement of the assembly. According to this design the housing 230, by-pass tube 22 and link mechanism provide an assembly that could readily be applied to the segregator disclosed in my earlier patent, above referred to, when it is desired to use the same in a fluid suction feed system.

Having thus described my invention, what I claim as new and desire to secure by Letters Patent of the United States is:

1. In a segregator mechanism comprising a chamber having inlet and outlet ports, a float operated valve mechanism disposed within said chamber to control one of said ports, and means completely enclosing said float operated valve mechanism and spaced substantially entirely from the walls of said chamber, said means comprising an upper deflector, a lower deflector, and a sieve interposed between said upper and lower deflectors.

2. In a segregator mechanism comprising a chamber having inlet and outlet ports, the inlet port being disposed in the upper portion of the chamber, a float operated valve mechanism disposed within said chamber to control one of said ports and means completely enclosing said float operated valve mechanism and spaced substantially entirely from the walls of said chamber, said means comprising an upper deflector, a lower deflector and a sieve interposed between said upper and lower deflectors, said upper deflector having a downwardly projecting flange below the inlet port and between the sieve and the wall of said chamber whereby the incoming fluids are directed toward the bottom of the chamber.

3. In a segregator mechanism comprising a chamber having a downwardly and inwardly sloping bottom and having inlet and outlet ports, a float operated valve mechanism disposed within said chamber to control one of said ports and means completely enclosing said float operated valve mechanism and spaced substantially entirely from the walls of said chamber, said means including an upper deflector, a lower deflector, and a sieve interposed between said upper and lower deflectors, said lower deflector forming with the bottom of said chamber a sump for the accumulation of foreign matter.

4. The combination with a segregator having a mechanism adapted to segregate non-miscible liquids of different specific gravities flowing through the segregator from a source of supply, said mechanism including a segregating chamber having an inlet for the non-miscible liquids, a first outlet for the heavier liquid, and a second outlet for the lighter liquid, a valve in the first outlet through which the heavier liquid is discharged, means operated by the heavier segregated liquid as the level thereof in said chamber varies for opening and closing said valve, suction means in communication with said segregating chamber through the second outlet for withdrawing the liquid of lighter specific gravity from the segregating chamber, an air inlet into the segregating chamber, valve means in said air inlet constructed and arranged to automatically move to closed position when the suction means is operative, and to automatically move to open position when the suction means is inoperative.

5. In a segregator having a liquid receiving chamber for effecting a gravitational segregation of non-miscible liquids of different specific gravities flowing through the segregator from a source of supply, said liquid chamber having an inlet, a first outlet for the heavier liquids, and a second outlet for the lighter liquids, a float operated valve mechanism disposed within said chamber and controlling the first outlet, suction means in communication with said liquid chamber through the second outlet for withdrawing the liquid of lighter specific gravity from said chamber, means for admitting air into said chamber, said air admitting means including a passage from the first outlet to atmosphere, and a valve in said passage and responsive to the suction in the segregating chamber, said valve in the air passage being constructed and arranged to automatically move to closed position when the suction means is operative and to automatically move to open position by the agent of gravity when the suction means is inoperative to admit air into the chamber and to cause discharging of the liquid of heavier specific gravity through said passage from the first outlet when the float operated valve mechanism opens the first outlet.

6. A segregator having a liquid receiving chamber for effecting a gravitational segregation of non-miscible liquids of different specific gravities flowing through the segregator from the source of supply, said chamber having an inlet for non-miscible liquids, a first outlet for the heavier liquids, a second outlet for the lighter liquids, a valve in the first outlet for controlling the discharge of heavier liquids from the chamber, a float disposed within said chamber for response to the level of heavier liquid segregated within said chamber, suction means in communication with said chamber through the second outlet for withdrawing the liquid of lighter specific gravity from the chamber, an air inlet into said chamber, valve means controlling said air inlet and responsive to the suction pressure within said chamber, said valve means being constructed and arranged to automatically move to closed position when the suction means is operative and to automatically move to open position when the suction means is inoperative, an auxiliary air inlet into said segregating chamber and means including a valve in said auxiliary air inlet and a control element operatively connected to said float for opening and closing said auxiliary air inlet as the level of the heavier segregated liquid in said segregator chamber varies whereby to accelerate the breaking of said suction pressure when the float occupies a predetermined position in said chamber.

7. In a segregator having a liquid receiving chamber for effecting the gravitational segregation of non-miscible liquids of different specific gravities flowing through the segregator from a source of supply, said chamber having an inlet for the non-miscible liquids, a first outlet for the heavier liquids, a second outlet for the lighter liquids, a valve in the first outlet for controlling the discharge of the heavier liquid from said chamber, a float disposed within said chamber and operatively connected to said valve for controlling the opening and closing of said valve in response to the level of the liquid of heavier specific gravity segregated in said chamber, suction means in communication with said chamber through the second outlet for withdrawing the liquid of lighter specific gravity from the segregator, means for admitting air into said chamber, said means including an air passage from the top of the chamber, and valve means in said passage and responsive to the suction pressure in said chamber, said valve means being constructed and arranged to automatically move to closed position when the suction means is operative and to automatically move to open position when the suction means is inoperative.

8. In combination with a segregator having a liquid chamber for effecting the gravitational segregation of non-miscible liquids of different specific gravities flowing through the segregator from a source of supply, said chamber having an inlet for the non-miscible liquids, a first outlet for the heavier liquid and a second outlet for the lighter liquid, a valve in the first outlet for controlling the discharge of heavier liquid from said chamber, suction means connected to said chamber through the second outlet for establishing the liquid flow through said chamber, an air inlet into said chamber, a valve in said air inlet constructed and arranged to automatically move to closed position when the suction means is operative and to automatically move to open position when the suction means is inoperative, and means controlled by the liquid segregated in said chamber for controlling the operation of said suction means.

9. In a liquid supply system, a source of supply, a segregator having a liquid receiving chamber for effecting the gravitational segregation of non-miscible liquids of different specific gravities flowing through the segregator, said chamber having an inlet for the non-miscible liquids, a first outlet for the heavier liquid, and a second outlet for the lighter liquid, a conduit connecting said inlet to said source, a valve in the first outlet for controlling the discharge of the heavier liquid from said chamber, a float disposed within said chamber and operatively connected to said valve for controlling the opening and closing of said valve in response to the level of the liquid of heavier specific gravity segregated in said chamber, suction means connected to said chamber by the second outlet for feeding the non-miscible liquids into the segregator chamber through said conduit and inlet and withdrawing the liquid of lighter specific gravity from said chamber through said second outlet, electromotive means for operating said suction means, and means operated by said float for controlling said electromotive means.

10. In a segregator having a liquid receiving chamber for effecting the gravitational segregation of non-miscibile liquids of different specific gravities flowing through the segregator from a source of supply, said chamber having an inlet for the non-miscible liquids, a first outlet for the heavier liquids, and a second outlet for the lighter liquids, a float in said chamber responsive to the rise and fall in level of the segregated liquid of heavier specific gravity, a valve in the first outlet and operatively connected to said float for control by the float to control the discharge of the heavier liquid from the chamber through said first outlet, a suction pump connected to the liquid chamber through the second outlet for establishing the flow of liquids through the segregator, means for admitting air into said liquid chamber, said air admitting means including an air inlet into said chamber, and suction responsive valve means in said air inlet constructed and arranged to automatically move to closed position sealing said chamber against atmosphere when the suction means is operative, and to automatically move to open position admitting air to said chamber when said suction pump is inoperative so that the discharge from said chamber of liquid of heavier specific gravity from the liquid of lighter specific gravity may be effected, electrically controllable means for controlling said suction pump, and electric means comprising a switch in circuit with said electrically controllable means and a link mechanism operatively connecting said float to said switch to break said circuit in a predetermined position of said float.

11. In combination with the segregator comprising a float chamber for effecting the gravitational segregation of non-miscible liquids of different specific gravity flowing through the segregator, said chamber having a first outlet for the heavier liquids and a second outlet for the lighter liquids, a float operated mechanism disposed within said float chamber and cooperating with said outlets to intermittently effect the gravitational discharge of the heavier liquids, a storage chamber positioned above said float chamber and having an inlet for the non-miscible liquids, and a conduit for the lighter liquid projecting upwardly from said float chamber into said storage chamber, said storage chamber having means to permit a gravitational flow of heavier liquid from said storage chamber to said float chamber restricted to a rate substantially in accordance with the rate of flow of heavier liquids from said first outlet.

12. In a liquid supply system a segregator for effecting an automatic segregation of liquids of heavier specific gravity from a liquid of lighter specific gravity when said liquids are in a non-miscible state, said segregator including a chamber provided with an inlet port for the non-miscible liquids and an outlet port for the liquids of lighter specific gravity, a source of liquid supply connected to the inlet port, a pump connected to one of said ports to suction feed the liquids through said inlet port to the chamber of the segregator from said source of supply and to conduct the liquid of lighter specific gravity from the chamber of said segregator through said outlet to the point of delivery, means for admitting air into said chamber when the pump is inoperative, said air admitting means including an air passage from said chamber to atmosphere and valve means in said air passage constructed and arranged for movement to closed position atmospherically sealing said segregator chamber when the suction pump is operative.

13. In a segregator mechanism adapted to automatically segregate a liquid of heavier specific gravity from a liquid of lighter specific gravity, which liquids are suction fed therethrough and normally stratify, means providing a liquid receiving chamber having an inlet opening for the liquids, a first outlet opening for the liquid of lighter specific gravity and a second outlet opening for the liquid of heavier specific gravity, said chamber being in communication with the atmosphere through said second outlet opening, suction means connected with the first outlet opening for suction feeding the liquids through said chamber, and valve means controlling the second outlet opening and responsive to the suction pressure produced by said suction means in said chamber, said valve means being constructed and arranged to automatically move to closed position closing said chamber to atmosphere when the suction means is operative and to automatically move to open position opening said second outlet to permit the discharge of accumulated liquid of heavier specific gravity from said chamber when the suction means is inoperative.

14. In a liquid supply system, a source of supply, a segregator positioned above said source of supply and including a liquid receiving casing adapted to automatically segregate a liquid of heavier specific gravity from a liquid of lighter specific gravity, which liquids normally stratify, said casing having an inlet pipe connecting said source of supply to the inlet of said casing and a non-return valve in said pipe, said casing having an outlet for the liquid of lighter specific gravity, a liquid delivery pipe, a suction pump having an inlet connected to the outlet of said casing and having an outlet connected to said delivery pipe to suction feed first the liquids from said source of supply to said casing, and suction feed the liquid of lighter specific gravity from said casing and then force said liquid of lighter specific gravity through said delivery pipe to a point of delivery, means for discharging a liquid of heavier specific gravity from said segregator casing and means operated by the segregated liquid of heavier specific gravity as the level thereof in said casing varies for automatically controlling said discharge means.

15. In a liquid supply system, a source of supply, a segregator positioned above said source of supply and including a liquid receiving casing adapted to automatically segregate a liquid of heavier specific gravity from a liquid of lighter specific gravity, which liquids normally stratify, said casing having an inlet pipe connecting said source of supply to the inlet of said casing and a non-return valve in said pipe, said casing having an outlet for the liquid of lighter specific gravity, a suction pump connected to said outlet to feed first the liquids from said source of supply to said casing, and thence the liquid of lighter specific gravity to a point of delivery, an electric motor for driving said pump and means for discharging the segregated liquid of heavier specific gravity from said segregator casing, said discharge means including means providing an outlet for the heavier liquid and a control valve in said outlet and means operated by the segregated liquid of heavier specific gravity as the level thereof in said casing varies for opening said valve to permit discharge of the liquid of heavier specific gravity, and electrical means controlled by said liquid level responsive means for stopping said motor upon accumulation of the heavier liquid to said predetermined level.

16. In a liquid supply system, a source of supply, a segregator positioned above said source of supply and including a liquid receiving casing adapted to automatically segregate a liquid of heavier specific gravity from a liquid of lighter specific gravity, which liquids normally stratify, said casing having an inlet pipe connecting said source of supply to the inlet of said casing and a non-return valve in said pipe, said casing having an outlet for the liquid of lighter specific gravity, a suction pump connected to said outlet to feed first the liquids from said source of supply to said casing, and thence the liquid of lighter specific gravity to a point of delivery, an electric motor for driving said pump, and electrical control means operated by the segregated liquid of heavier specific gravity as said heavier segregated liquid accumulates in said segregator casing to a predetermined level for stopping said motor.

17. In a liquid supply system, a source of supply, a segregator positioned above said source of supply and including a liquid receiving casing adapted to automatically segregate a liquid of heavier specific gravity from a liquid of lighter specific gravity, which liquids normally stratify, said casing having an inlet pipe connecting said source of supply to the inlet of said casing and a non-return valve in said pipe, said casing having an outlet for the liquid of lighter specific gravity, a suction pump connected to said outlet to feed first the liquids from said source of supply to said casing, and thence the liquid of lighter specific gravity to a point of delivery, an electric motor for driving said pump, and electrical control means operated by the segregated liquid of heavier specific gravity as said heavier segregated liquid accumulates in said segregator casing to a predetermined level for altering the driving relation between the motor and the pump.

18. In a liquid supply system, a source of supply, a segregator positioned above said source of supply and including a liquid receiving casing adapted to automatically segregate a liquid of heavier specific gravity from a liquid of lighter specific gravity, which liquids normally stratify, said casing having an inlet pipe connecting said source of supply to the inlet of said casing and a non-return valve in said pipe, said casing having an outlet for the liquid of lighter specific gravity, a suction pump connected to said outlet to feed first the liquids from said source of supply to said casing, and thence the liquid of lighter specific gravity to a point of delivery, said casing having an outlet for the liquid of heavier specific gravity, means for controlling the opening and closing of said last-mentioned outlet, an electric motor for driving said pump, an electric control circuit for said motor, and means operated by the liquid of heavier specific gravity as the level thereof in said casing varies for breaking said control circuit to stop said motor when the heavier liquid is above a predetermined level and to make said control circuit to start said motor when the heavier liquid is below said predetermined level.

19. In a liquid supply system, a source of supply, a segregator positioned above said source of supply and including a liquid receiving casing adapted to automatically segregate a liquid of heavier specific gravity from a liquid of lighter specific gravity, which liquids normally stratify, said casing having an inlet pipe connecting said source of supply to the inlet of said casing and a non-return valve in said pipe, said casing having an outlet for the liquid of lighter specific gravity, a liquid delivery pipe, a suction pump having an inlet connected to the outlet of said casing and having an outlet connected to said delivery pipe to suction feed first the liquids from said source of supply to said casing, and suction feed the liquid of lighter specific gravity from said casing and then force said liquid of lighter specific gravity through said delivery pipe to a point of delivery, means for discharging the segregated liquid of heavier specific gravity from said segregator casing, said means including a discharge port and shiftable closure means for opening and closing said discharge port.

20. In combination, a segregator comprising a first chamber for effecting the gravitational segregation of non-miscible liquids of different specific gravity, said chamber having a first discharge outlet to atmosphere for the liquid of heavier specific gravity and a second outlet for the liquid of lighter specific gravity, a float operated valve mechanism disposed within said chamber and controlling said first outlet, a storage chamber positioned above said first chamber, said storage chamber having an inlet for the liquids, vent means including a stand pipe in said storage chamber and opening at its bottom into said first chamber to facilitate the segregation of the heavier liquid in the storage chamber and the flow of the lighter liquid into the first chamber, suction mechanism in communication with said chambers to establish a flow of liquids through said chambers, and valve means in the first outlet and constructed and arranged to automatically move to closed position when the suction mechanism is operative, thereby to close said first outlet to atmosphere, and to automatically move to open position when the suction mechanism is inoperative, thereby to open said first outlet to atmosphere, said vent means also comprising a restricted port in the bottom of the storage chamber and opening into the float chamber to permit a restricted gravitational flow of the heavier liquid from the bottom of said storage chamber to said first chamber at a rate substantially in accordance with the rate of flow of the heavier liquid from said first discharge outlet of the first chamber whereby substantially all of the liquid of heavier specific gravity accumulated in said storage chamber and said first chamber is discharged in a single continuous operation after the suction mechanism has stopped operation.

21. The combination with a segregator having a mechanism adapted to segregate non-miscible liquids of different specific gravities flowing through the segregator from a source of supply, said mechanism including a segregating chamber having an inlet for the non-miscible liquids, a first outlet for the heavier liquid, a second outlet for the lighter liquid, a valve in the first outlet through which the heavier liquid is discharged, means operated by the heavier segregated liquid as the level thereof in said chamber varies for opening and closing said valve, suction means connected to the second outlet of the segregating chamber for withdrawing the liquid of lighter specific gravity from the chamber, an air inlet into the segregating chamber, and valve means in said air inlet and responsive to the degree of vacuum in the segregating chamber, said valve means being constructed and arranged to automatically move to closed position when the suction means is operative and to automatically move to open position when the suction means is inoperative.

22. In a liquid supply system, a source of supply, a segregator having a mechanism adapted to segregate non-miscible liquids of different specific gravities flowing through the segregator from the source of supply, said mechanism including a segregating chamber having an inlet for the non-miscible liquids, a first outlet for the heavier liquid, a second outlet for the lighter liquid, a conduit connecting said inlet to said source of supply, a valve in the first outlet through which the heavier liquid is discharged, control means operated by the heavier segregated liquid as the level thereof in said chamber varies for opening and closing said valve, suction means in communication with said segregating chamber through said second outlet for feeding the liquids from the source of supply into the segregating chamber through said inlet and withdrawing the liquid of lighter specific gravity from said chamber through said second outlet, and means for admitting air into said segregating chamber, said air admitting means including a main air passage in communication with said segregating chamber, a first valve in said main air passage and responsive to the degree of vacuum pressure within said segregating chamber for closing said air passage to seal said segregating chamber to atmosphere when the suction means is operative, and for opening said air passage to open the chamber to atmosphere when the suction means is inoperative, an auxiliary air passage in communication with said segregating chamber, a second valve in said auxiliary air passage, and means including said control means for operating said second valve by the heavier segregated liquid as the level thereof in said chamber varies to accelerate the opening of the first valve in the main air passage.

23. In a liquid supply system, a source of supply, a segregator having a liquid receiving chamber for effecting a gravitational segregation of non-miscible liquids of different specific gravities flowing through the chamber from the source of supply, said chamber having an inlet for the non-miscible liquids, a first outlet for the heavier liquids, and a second outlet for the lighter liquids, a conduit connecting said inlet to said source, a float operated valve mechanism disposed within said chamber for controlling the first outlet, suction means in communication with said chamber through the second outlet for feeding the non-miscible liquids into said chamber through said conduit and inlet and withdrawing the liquid of lighter specific gravity from said chamber through said second outlet, an air inlet into said chamber, valve means in said air inlet and responsive to the suction pressure in said chamber, the valve means in said air inlet being constructed and arranged to automatically move to closed position when the suction means is operative, means operatively connected to said float operated valve mechanism for controlling the second outlet to shut off communication between the chamber and the suction means when the first outlet is open, said valve means being constructed and arranged to automatically move to open position when communication between the chamber and the suction means is shut off.

24. In a liquid supply system, a source of supply, a segregator positioned above said source of supply including a liquid receiving casing adapted to automatically segregate a liquid of heavier specific gravity from a liquid of lighter specific gravity, which liquids normally stratify, said casing having an inlet, a supply pipe connecting said source of supply to the inlet of said casing, a non-return valve in said pipe, said casing having an outlet for the liquid of lighter specific gravity, a flow line including said outlet, a liquid delivery pipe, a suction pump having an inlet connected to the outlet of said casing through said flow line and having an outlet connected to said delivery pipe to suction feed first the liquids from said source of supply through the supply pipe to said casing and suction feed the liquid of lighter specific gravity from said casing through said flow line and then force the liquid of lighter specific gravity through said delivery pipe to the point of delivery, valve means in the flow line, means operated by the liquid of heavier specific gravity when accumulated in said casing to a predetermined level for automatically closing said valve means to close said flow line, said liquid receiving casing having an outlet for the liquid of heavier specific gravity, and means controlling said outlet.

25. In a liquid supply system, a source of supply, a segregator positioned above said source of supply and including a liquid receiving casing adapted to automatically segregate a liquid of heavier specific gravity from a liquid of lighter specific gravity, which liquids normally stratify, said casing having an inlet pipe connecting said source of supply to the inlet of said casing and a non-return valve in said pipe, said casing having an outlet for the liquid of lighter specific gravity, a suction pump connected to said outlet to feed first the liquids from said source of supply to said casing, and thence the liquid of lighter specific gravity to a point of delivery, said segregator casing having an outlet for the liquid of heavier specific gravity, a valve controlling said outlet, an electric motor for driving said pump, an energizing circuit for said motor, and means operated by the liquid of heavier specific gravity as the level thereof in said segregator casing varies for automatically respectively breaking and making said circuit and operating said valve, to stop said motor and open the valve when the heavier liquid is above a predetermined level in the segregator casing, and to maintain the motor energized and the valve closed when the heavier liquid is below a predetermined level in the segregator casing.

26. In a liquid supply system, a source of supply, a segregator positioned above said source of supply and including means forming a chamber adapted to automatically segregate a liquid of heavier specific gravity from a liquid of lighter specific gravity, which liquids normally stratify, an inlet pipe connecting said source of supply to said chamber and having a non-return valve, said chamber having an outlet for the liquid of lighter specific gravity, a liquid delivery pipe, a suction pump having an inlet connected to said outlet of the chamber and having an outlet connected to said delivery pipe to suction feed first the liquids from said source of supply to said chamber and suction feed the liquid of lighter specific gravity from said chamber and then force the liquid of lighter specific gravity through said delivery pipe to the point of delivery, said segregator chamber having an outlet for the liquid of heavier specific gravity, and means controlling said outlet.

DAVID SAMIRAN.